May 23, 1933. N. M. BAKER 1,910,456
GOGGLES
Filed May 2, 1929
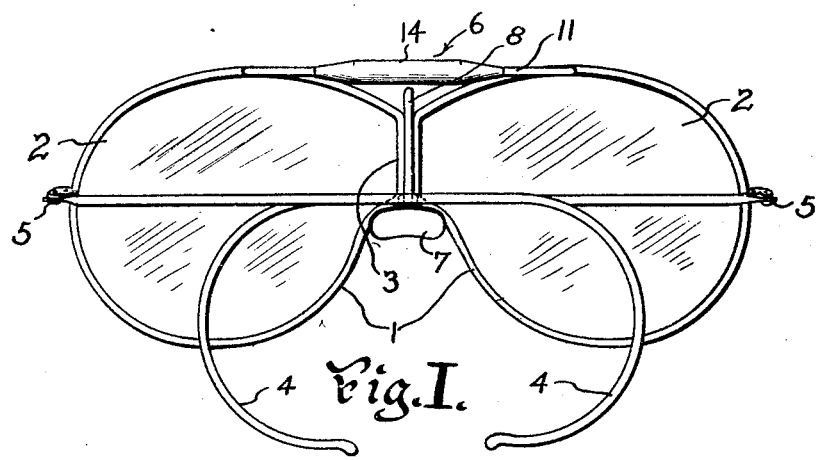
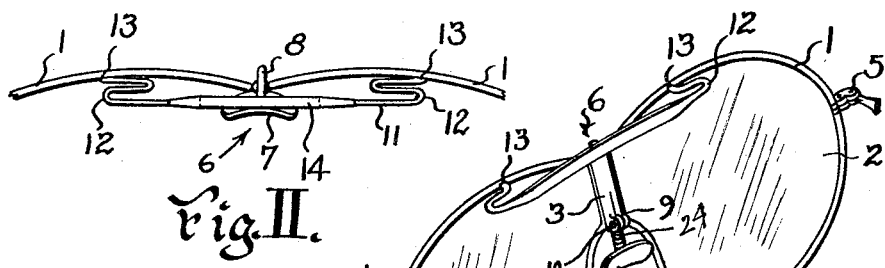
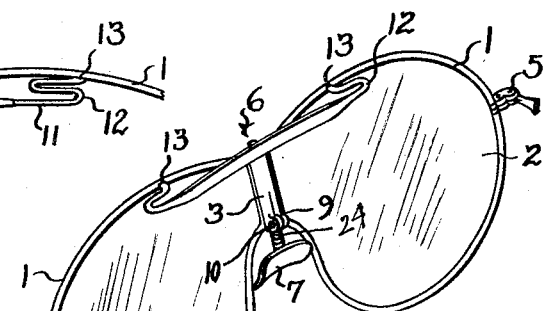
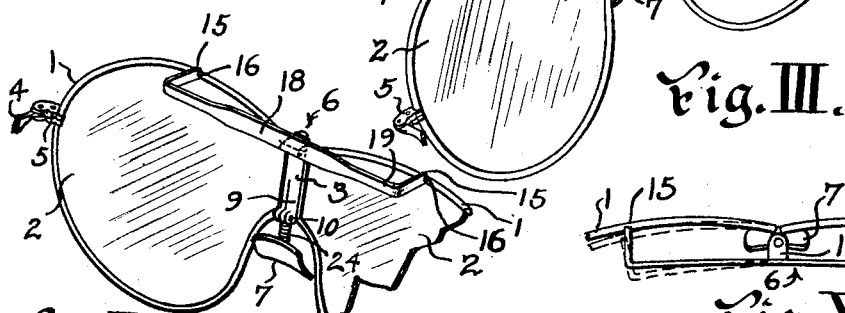
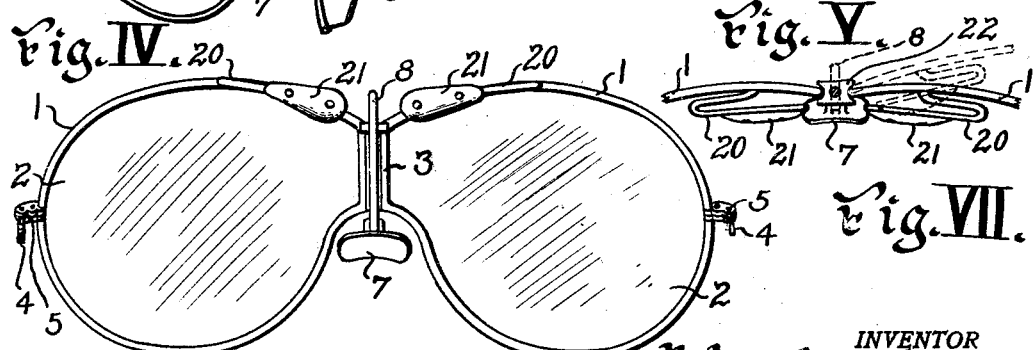

Patented May 23, 1933

1,910,456

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

GOGGLES

Application filed May 2, 1929. Serial No. 359,909.

This invention relates to goggles and has particular reference to improved means for positioning and retaining goggles rigidly before the eyes of the wearer.

The principal object of the invention is to provide improved means for supporting a goggle before the eyes of the wearer.

Another object of the invention is to provide improved means for adjusting the distance between the eyes and lenses of a goggle.

Another object of the invention is to provide improved means for retaining the goggle on the head in adjusted position.

Another object of the invention is to provide improved means for supporting the nose bearing pad.

Another object of the invention is to provide improved means to limit the movement of the lenses.

Another object of the invention is to provide simple, efficient and economical means for adjustably positioning a goggle on the head and retaining it rigidly in adjusted position.

Other objects and advantages of the invention will be apparent from the following description taken in connection with the accompanying drawing, and it will be understood that many changes may be made in the arrangements of parts and details of construction without departing from the spirit of the invention as expressed by the accompanying claims. I, therefore, do not wish to be limited to the exact details and arrangements shown and described as the preferred forms only have been shown by way of illustration.

Referring to the drawing:

Fig. I is a rear view of a goggle embodying the invention;

Fig. II is a fragmentary top or plan view of Fig. I;

Fig. III is a perspective view of a modification;

Fig. IV is a perspective view of another modification;

Fig. V is a top fragmentary view of Fig. IV;

Fig. VI is a rear view of still another modification;

Fig. VII is a top or plan view of Fig. VI.

In prior art goggles of the character stated there have been several difficulties. One of these difficulties was that there was no means for positioning the lenses at a desired distance from the eye. Another difficulty was that there was no way to stop the shifting or sliding of the goggle when the head was moved. This moved the center of the lenses out of alignment with the eyes, thereby not giving the wearer the widest field of vision possible with the lenses. Also, every time the goggles were worn it was necessary to bend them to fit the head. Therefore, it is the prime object of my invention to provide an improved goggle which will fit snugly on the head and which will allow the distance between the lenses and the eyes to be adjusted and which will keep the lenses bent to the curve of the head whereby they may be readily put on.

Referring more particularly to the drawing wherein similar reference characters denote corresponding parts throughout, the goggle embodying the invention comprises broadly a pair of lens rims 1 containing the lenses 2 and connected by the bridging member 3, and supported on the face by the temples 4, which are pivoted on the end-pieces 5, and having the forehead rest or bracing member 6 and nose bearing pad 7.

The nose bearing pad 7 is of the usual type and is connected to the bridging member 3 by the arm 8. This arm 8 may be of the usual type as shown in Figs. I, II and VI or may be a flexible cable 24 as shown in Figs. III and IV, which extends into the hollow bridging member 3 and provides a pivot for the lenses. The said cable member 24 provides flexible or resilient means by which the nose rest or bearing pad 7 may adjust itself to the facial requirements of the wearer and thereby relieves excessive pressure on the nose. The length of the arm 24 is regulated by the split end 9 of the bridging member 3. This with the transverse screw 10 forms a clamp to hold the arm 24 in adjusted position.

The forehead rest or bracing member 6 comprises a straight bar portion 11 and looped end portions 12. The end portions 12 are connected at their extremities 13 to the rear of the lens rims 1, preferably by solder or the like. If desired, the straight bar portion 11 may be covered with a pad or the like 14.

In the modification shown in Fig. III, I have shown the ends 13 of the looped portions 12 fitting into notches in the rear of the lens rims 1, where they are securely retained, preferably by solder or the like.

In another modification shown in Figs. IV and V, the ends 15 of the bracing member 11 are provided with notches 16. The lens rims 1 are then engaged in said notches. The center of said bar 11 is rigidly secured to the extension 17 from the bridging member 3. Thus the lens rims and ends of the bracing bar are resiliently engaged. In this modification, as shown in Fig. IV, the bracing bar 11 has a widened center portion 18 which gives it better contact with the head and narrow end portions 19 which provide resiliency for remaining in contact with the lens rims.

In still another modification, as shown in Figs. VI and VII, I have constructed the forehead rest of two members 20 each having at one end a pad 21 and connected at the other extremity to the rear of the lens rims 1. This allows independent adjustment of the forehead rests. In this modification I also provide means to limit the pivotal movement of the lenses. This is done by providing the bridging member 3 with shoulders 22 which limit the pivotal movement of the lenses, as shown in dotted lines in Fig. VII.

Although I have shown this means to limit the pivotal movement of the lenses only in Fig. VII, it may be used with any of the forms illustrated. If desired this means to limit the pivotal movement of the lenses need not be used in the form illustrated in Fig. VII; this would allow the goggle to be folded for placing in the pocket or case.

The operation of the device is as follows: To adjust the forehead rest or bracing bar 11, the loops 12 adjacent the ends of the bar are adjusted towards or away from each other, depending on the distance from the eyes the lenses are desired, and also depending on the curve of the head. It is only necessary to adjust this forehead rest 11 once as thereafter it holds the lenses bent to the curve of the face whereby they may be readily put on. The rigid contact between the forehead rest 11 and the forehead retains the lens from shifting or slipping and holds the lenses at the desired distance from the eyes.

To adjust the modification shown in Figs. IV and V, it is merely necessary to put on the goggles and the pressure of the lens rims on the resilient ends of the forehead rest will hold the rest firmly against the forehead and the goggles snugly on the head.

To adjust the modification shown in Figs. VI and VII, the arms are independently adjusted and the goggle put on, which holds the lenses at the desired distance from the eyes and the goggle firmly on the head. In this modification the movement of the lens rims 1 cause them to contact with the shoulders 22 on the bridging member 3 and does not allow further movement of the lens rims.

To adjust the nose pad 7, the arm 8, which is preferably a flexible cable, is bent to desired position. To adjust the length of the nose pad supporting arm 8, the screw 10 on the projection on the split end 9 of the bridging member 3 is loosened and the arm 8 moved vertically in the hollow bridging member to desired position when the screw is again tightened to fix the arm in adjusted position.

From the foregoing description it will be seen that I have provided simple, efficient and economical means for adjusting the distance between the lenses and the eyes and for retaining the goggle firmly on the head in adjusted position, and also means whereby the goggle will remain adjusted to the curve of the head after it is once adjusted, and allow adjustment to fit heads of different persons.

Having described my invention, I claim:

1. In an ophthalmic mounting, means for holding a pair of lenses, means for connecting the two lens holding means, a nose pad adapted to rest on the bridge of the nose and positioned below the means connecting the lens holding means and a spirally bent and flexible cable support connecting the said nose pad and said means connecting the lens holding members, the flexibility of said cable support being within limits whereby the cable may be deflected by the weight alone of the mounting to adjust the nose pad to the nose.

2. In a device of the character described, means for holding a pair of lenses, a hinge like member for connecting the two lens holding means, a flexible forehead rest member having each of its ends engaging one of the lens holding members and having a bar portion extending substantially in the plane of the lenses on the eye side thereof from one lens holding means to the other, the end portions extending to a loop, thence reversely towards the nasal sides of the lens holding means, and thence to a connection with the respective lens holding means whereby the angle between the lens holding means may be adjusted and fixed by bending the forehead rest.

3. In an ophthalmic mounting, means for holding a pair of lenses, means for connecting the two lens holding means, a forehead rest member whose ends respectively engage one of the lens holding members and having a bar portion extending substantially in the plane of the lenses on the eye side thereof and having a loop portion adjacent the point of engagement with the lens holding member, said loop being capable of being bent to position the bar portion in required adjustment for the individual wearer, a nose pad adapted to rest on the bridge of the nose and a flexible cable support connecting the said nose pad and said means connecting the lens holding members the flexibility of said cable support being within limits whereby the cable may be deflected by the weight alone of the mounting to adjust the pad to the nose.

4. In an ophthalmic mounting, a pair of lens holding means, a hinge like member connecting the nasal sides of said lens holding means, a nose pad below said hinge like member, a flexible member comprising a spirally bent portion connecting the pad to the hinge like member, the flexibility of the flexible member being within limits whereby it will be deflected by the weight alone of the mounting to adjust the pad to the nose and a flexible forehead rest connected to the respective lens holding means between their ends on the eye side and spaced from said lens holding means whereby the angle between the lens holding means may be adjusted and fixed on the hinge like member by bending said forehead rest.

NELSON M. BAKER.